United States Patent
Washio et al.

(10) Patent No.: US 11,458,946 B2
(45) Date of Patent: Oct. 4, 2022

(54) HYBRID VEHICLE AND METHOD OF CONTROLLING HYBRID VEHICLE

(71) Applicant: TOYOTA JIDOSHA KABUSHIKI KAISHA, Toyota (JP)

(72) Inventors: Taichi Washio, Okazaki (JP); Masayuki Baba, Toyota (JP); Nobufusa Kobayashi, Okazaki (JP)

(73) Assignee: TOYOTA JIDOSHA KABUSHIKI KAISHA, Toyoto (JP)

( * ) Notice: Subject to any disclaimer, the term of this patent is extended or adjusted under 35 U.S.C. 154(b) by 122 days.

(21) Appl. No.: 17/128,969

(22) Filed: Dec. 21, 2020

(65) Prior Publication Data
US 2021/0221352 A1  Jul. 22, 2021

(51) Int. Cl.
*B60W 10/08* (2006.01)
*B60W 20/40* (2016.01)
*B60L 15/20* (2006.01)
*B60W 10/06* (2006.01)

(52) U.S. Cl.
CPC ......... *B60W 10/08* (2013.01); *B60L 15/2054* (2013.01); *B60W 10/06* (2013.01); *B60W 20/40* (2013.01); *B60L 2240/423* (2013.01)

(58) Field of Classification Search
CPC ...... B60W 10/08; B60W 10/06; B60W 20/40; B60W 2510/081; B60W 2510/0208; B60W 2710/021; B60W 2710/0666; B60L 15/2054; B60L 2240/423; B60L 50/15; B60K 6/48; B60K 2006/4816
See application file for complete search history.

(56) References Cited

U.S. PATENT DOCUMENTS

| | | | |
|---|---|---|---|
| 6,364,807 B1* | 4/2002 | Koneda | B60W 10/02 180/65.285 |
| 2009/0312144 A1* | 12/2009 | Allgaier | B60W 10/02 180/65.245 |
| 2015/0032358 A1 | 1/2015 | Amemiya | |
| 2015/0239467 A1* | 8/2015 | Wang | B60K 6/48 180/65.265 |
| 2016/0059845 A1* | 3/2016 | Nefcy | B60W 30/18127 180/65.265 |

FOREIGN PATENT DOCUMENTS

JP    5949899 B2    6/2016

* cited by examiner

*Primary Examiner* — George C Jin
(74) *Attorney, Agent, or Firm* — Sughrue Mion, PLLC (57) ABSTRACT

A clutch is disengaged when a torque condition is satisfied at a predetermined time when a system is stopped as a fuel supply to an engine is stopped from a state where the engine is operating with the clutch being engaged. The torque condition is a condition under which torque acting on an output shaft of the engine is torque in a direction in which an engine speed of the engine is decreased and torque output to a rotary shaft of a motor is torque in a direction in which a motor speed of the motor is decreased.

6 Claims, 5 Drawing Sheets

HYBRID VEHICLE AND METHOD OF CONTROLLING HYBRID VEHICLE

CROSS-REFERENCE TO RELATED APPLICATION

This application claims priority to Japanese Patent Application No. 2020-005093 filed on Jan. 16, 2020, incorporated herein by reference in its entirety.

BACKGROUND

1. Technical Field

The disclosure relates to a hybrid vehicle and a method of controlling the hybrid vehicle, and more particularly, to a hybrid vehicle including an engine, a motor, and a clutch, and a method of controlling the hybrid vehicle.

2. Description of Related Art

In the related art, a hybrid vehicle of this type has been proposed that includes an engine for traveling (internal combustion engine), a motor for traveling (electric motor-generator), and a clutch (refer to, for example, Japanese Patent No. 5949899 (JP 5949899 B)). The clutch connects and disconnects an output shaft of the engine to and from a rotary shaft of the motor. In this hybrid vehicle, when the clutch is normal in the case where a system is stopped while the engine is operating, a fuel supply to the engine is cut off and the engine is stopped after the clutch is disengaged. When the clutch has an abnormality, torque output from the engine is decreased while the motor is functioning as a generator with the clutch engaged and the engine is stopped. This suppresses an increase (racing) of an engine speed when the system is stopped.

SUMMARY

However, in the above hybrid vehicle, when the engine or the motor outputs torque in a direction in which the engine speed and a motor speed are increased as the clutch is disengaged due to the system stop, the engine speed may increase (race), and a motor speed may increase. A user does not expect an increase in the engine speed and the motor speed when the system is stopped. Therefore, such an increase in the engine speed and the motor speed may make the user feel discomfort.

A hybrid vehicle and a method of controlling the hybrid vehicle according to the disclosure have an objective to suppress an increase (racing) of the engine speed and an increase of the motor speed when the system is stopped.

The hybrid vehicle and the method of controlling the hybrid vehicle according to the disclosure employ the following means to achieve the objective as described above.

A hybrid vehicle according to an aspect of the disclosure includes an engine, a motor, a clutch, and an electronic control unit. The clutch is configured to connect and disconnect an output shaft of the engine to and from a rotary shaft of the motor. The electronic control unit is configured to control the engine, the motor, and the clutch, and disengage the clutch when a torque condition is satisfied at a predetermined time when a system is stopped as a fuel supply to the engine is stopped from a state where the engine is operating with the clutch being engaged. The torque condition is a condition under which torque acting on the output shaft of the engine is torque in a direction in which an engine speed of the engine is decreased and torque output to the rotary shaft of the motor is torque in a direction in which a motor speed of the motor is decreased.

In the hybrid vehicle according to this aspect, the clutch is disengaged when the torque condition is satisfied at the predetermined time when the system is stopped as the fuel supply to the engine is stopped from a state where the engine is operating with the clutch being engaged. The torque condition is a condition under which the torque acting on the output shaft of the engine is torque in the direction in which the engine speed of the engine is decreased and the torque output to the rotary shaft of the motor is torque in the direction in which the motor speed of the motor is decreased. When the torque that acts on the output shaft of the engine is the torque in the direction in which the engine speed is decreased, and the torque that is output to the rotary shaft of the motor is the torque in the direction in which the motor speed is decreased, the clutch is disengaged. Therefore, an increase (racing) of the engine speed and an increase of the motor speed can be suppressed.

In the aspect above, the electronic control unit may be configured to, at the predetermined time, control the motor such that torque having a value of zero or torque in a direction in which a rotation speed of the rotary shaft is decreased acts on the rotary shaft of the motor and disengage the clutch when the torque condition is satisfied.

In the aspect above, the electronic control unit may be configured to, at the predetermined time, disengage the clutch when the motor speed of the motor reaches or falls below a predetermined motor speed, regardless of whether the torque condition is satisfied. With this configuration, reverse rotations of the engine and the motor after the clutch is disengaged can be suppressed.

In the aspect above, the electronic control unit may be configured to control the motor such that a difference between a first decrease rate and a second decrease rate is equal to or less than a predetermined difference after the clutch is disengaged. The first decrease rate may be a decrease amount of the engine speed of the engine per unit time, and the second decrease rate may be a decrease amount of the motor speed of the motor per unit time. With this configuration, after the clutch is disengaged, an excessive delay in a decrease of the motor speed, compared to a decrease of the engine speed, can be suppressed. Therefore, it is possible to suppress extension of time from the disengagement of the clutch to the stop of the rotation of the motor.

In the aspect above, the electronic control unit may be configured to disengage the clutch after a certain time has elapsed from the predetermined time, regardless of whether the torque condition is satisfied.

A method of controlling a hybrid vehicle according to another aspect of the disclosure includes: stopping a fuel supply to an engine in a state where an output shaft of the engine and a rotary shaft of a motor are connected via a clutch and the engine is operating; and disengaging the clutch when a torque condition is satisfied, the torque condition being a condition under which torque acting on the output shaft of the engine is torque in a direction in which an engine speed of the engine is decreased, and torque output to the rotary shaft of the motor is torque in a direction in which a motor speed of the motor is decreased.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, modes for carrying out the disclosure will be described using an embodiment.

Figure 1:
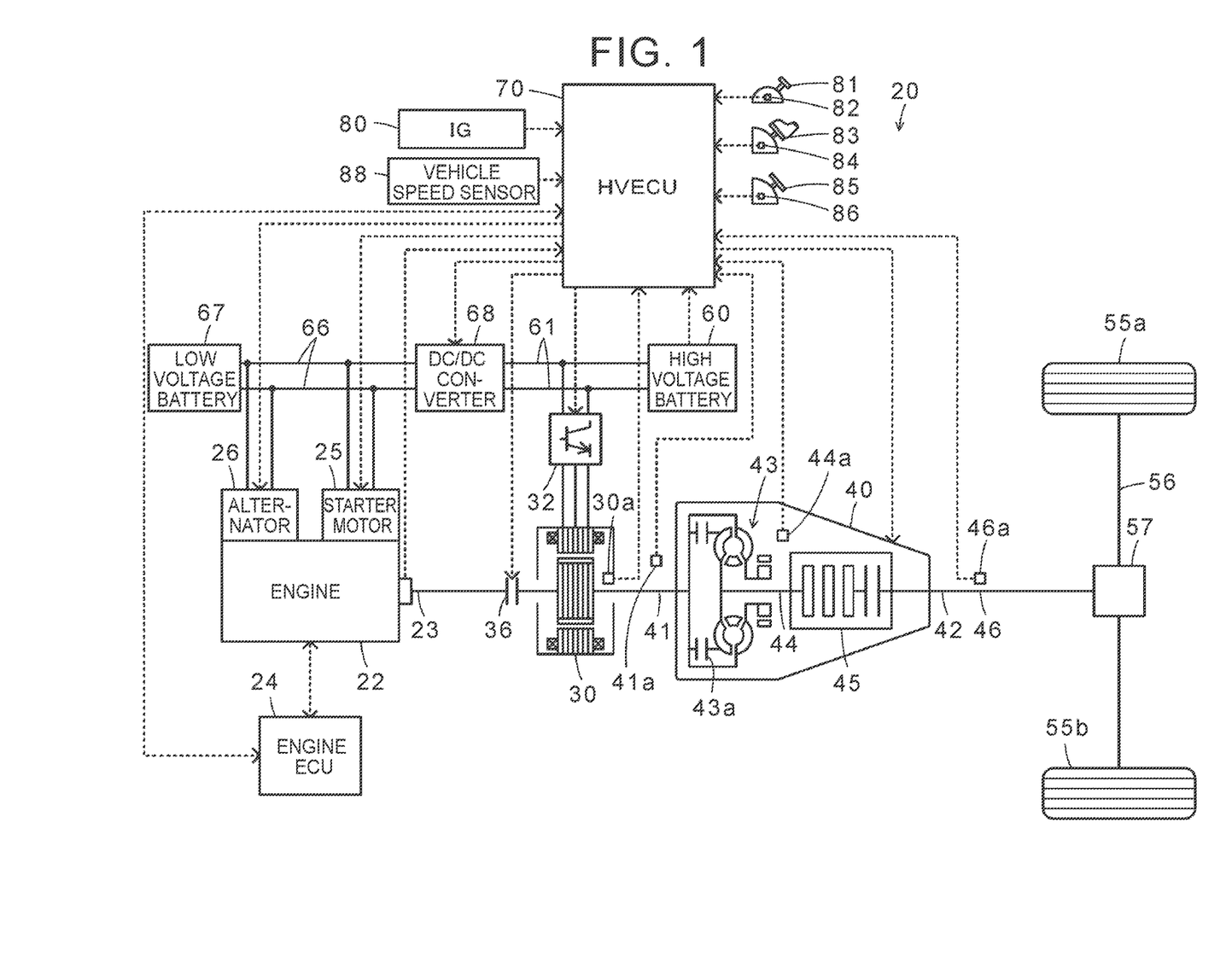
FIG. 1 is a configuration diagram schematically showing a configuration of a hybrid vehicle 20 as an embodiment of the disclosure.
Figure 2:
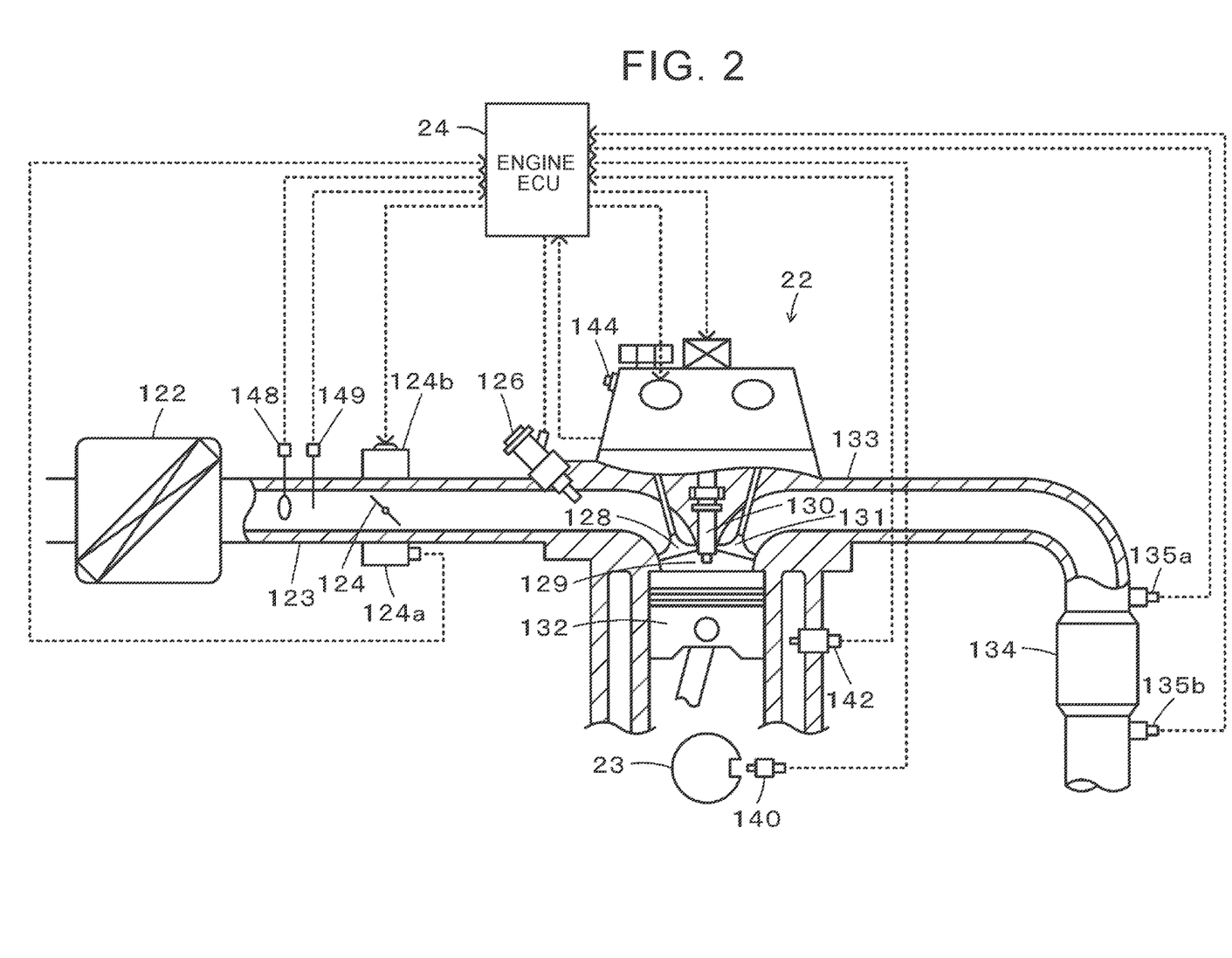
FIG. 2 is a configuration diagram schematically showing a configuration of an engine 22.

FIG. 1 is a configuration diagram schematically showing a configuration of a hybrid vehicle 20 as an embodiment of the disclosure, and FIG. 2 is a configuration diagram schematically showing a configuration of an engine 22. As shown in FIG. 1, the hybrid vehicle 20 according to the embodiment includes an engine 22, a motor 30, an inverter 32, a clutch 36, an automatic transmission device 40, a high voltage battery 60, a low voltage battery 67, and a DC/DC converter 68, and a hybrid electronic control unit (hereinafter referred to as "HV ECU") 70.

The engine 22 is configured as a four-cylinder internal combustion engine that outputs a power through each stroke of intake, compression, expansion (explosive combustion), and exhaust using gasoline or light oil supplied as fuel from a fuel tank through a fuel supply system. As shown in FIG. 2, the engine 22 takes in an air cleaned by an air cleaner 122 into an intake pipe 123, causes the intake air to pass through a throttle valve 124, and injects the fuel from a fuel injection valve 126 to mix the intake air and the fuel. The engine 22 then takes in the air-fuel mixture into a combustion chamber 129 through an intake valve 128. Then, in the engine 22, the intake air-fuel mixture is explosively combusted by electric sparks generated from a spark plug 130, and a reciprocating motion of a piston 132 that is pushed down by an energy generated from the combustion is transferred into a rotary motion of a crankshaft 23. An exhaust gas discharged from the combustion chamber 129 to an exhaust pipe 133 via an exhaust valve 131 is discharged to the outside air through an exhaust gas control device 134 including a catalyst (three-way catalyst) 134a that removes harmful components such as carbon monoxide (CO), hydrocarbons (HC), and nitrogen oxides (NOx). An operation of the engine 22 is controlled by an engine electronic control unit (hereinafter referred to as "engine ECU") 24.

Although not shown, the engine ECU 24 is configured as a microprocessor having a central processing unit (CPU) as a main part, and includes a read-only memory (ROM) that stores processing programs, a random access memory (RAM) that temporarily stores data, input and output ports, and a communication port, in addition to the CPU. Signals from various sensors required for controlling the operation of the engine 22 are input to the engine ECU 24 via the input port. The signals input to the engine ECU 24 include, for example, a crank angle θcr output from a crank position sensor 140 that detects a rotational position of the crankshaft 23 of the engine 22 and a coolant temperature Tw from a coolant temperature sensor 142 that detects a temperature of a coolant of the engine 22. The signals input to the engine ECU 24 also include cam angles θci, θco output from a cam position sensor 144 that detects a rotational position of an intake camshaft that opens and closes the intake valve 128 and a rotational position of an exhaust camshaft that opens and closes the exhaust valve 131. The signals input to the engine ECU 24 also include a throttle opening TH output from a throttle position sensor 124a that detects a position of a throttle valve 124, an intake air amount Qa output from an air flow meter 148 attached to the intake pipe 123, and an intake air temperature Ta from a temperature sensor 149 attached to the intake pipe 123. The signals input to the engine ECU 24 also include an air-fuel ratio AF output from an air-fuel ratio sensor 135a attached to an exhaust pipe 133 and an oxygen signal O2 from an oxygen sensor 135b attached to the exhaust pipe 133.

Various control signals for controlling the operation of the engine 22 are output from the engine ECU 24 via the output port. Examples of signals output from the engine ECU 24 include a control signal output to a throttle motor 124b that adjusts a position of the throttle valve 124, a control signal output to the fuel injection valve 126, and a control signal output to the spark plug 130. The engine ECU 24 is connected to the HV ECU 70 via the communication port.

The engine ECU 24 calculates an engine speed Ne of the engine 22 based on the crank angle θcr output from the crank position sensor 140, and a load ratio KL (a ratio of a volume of the air that is actually taken in in one cycle to a stroke volume of the engine 22 per cycle) based on the intake air amount Qa output from the air flow meter 148 and the engine speed Ne of the engine 22.

As shown in FIG. 1, the crankshaft 23 serving as the output shaft of the engine 22 is connected to a starter motor 25 for cranking the engine 22 and an alternator 26 for generating an electric power using the power from the engine 22.

The motor 30 is configured as, for example, a synchronous generator motor. The inverter 32 is used to drive the motor 30 and is connected to a high voltage side power line 61. The HV ECU 70 controls switching of a plurality of switching elements of the inverter 32 such that the motor 30 is rotationally driven.

The clutch 36 is configured as, for example, a hydraulically driven friction clutch that is driven by a hydraulic pressure supplied by a mechanical oil pump (not shown) that is driven by the motor 30. The clutch 36 connects and disconnects the crankshaft 23 of the engine 22 to and from a rotary shaft of the motor 30.

The automatic transmission device 40 includes a torque converter 43, a 6-speed automatic transmission 45, and a hydraulic circuit (not shown). The torque converter 43 is configured as a general hydraulic transmission device, and transmits power of an input shaft 41 connected to the rotary shaft of the motor 30 to an intermediate rotary shaft 44 that is an input shaft of the automatic transmission 45 with amplifying torque or as it is without amplifying torque. The torque converter 43 includes a pump impeller attached to the input shaft 41, a turbine runner connected to the intermediate rotary shaft 44, a stator that rectifies a flow of hydraulic oil from the turbine runner to the pump impeller, a one-way clutch that limits a rotation direction of the stator to one direction, and a lock-up clutch 43a that is hydraulically driven and connects the pump impeller and the turbine runner. The automatic transmission 45 is connected to the intermediate rotary shaft 44 and an output shaft 42 that is connected to a drive shaft 46. The automatic transmission 45 includes a plurality of planetary gears and a plurality of hydraulically driven friction engagement elements (clutch and brake). The drive shaft 46 is connected to rear wheels 55a, 55b via an axle 56 and a rear differential gear 57. For example, the automatic transmission 45 establishes forward speeds from the first gear to the sixth gear and a reverse speed by engaging and disengaging the frictional engagement elements so as to transmit the power between the intermediate rotary shaft 44 and the output shaft 42.

The high voltage battery 60 is configured as, for example, a lithium ion secondary battery, and is connected to the high voltage side power line 61 together with the inverter 32. A low voltage battery 67 is configured as, for example, a lead-acid battery having a rated voltage that is lower than that of the high voltage battery 60, and is connected to a low voltage side power line 66 together with the starter motor 25 and the alternator 26. The DC/DC converter 68 is connected to the high voltage side power line 61 and the low voltage side power line 66. The DC/DC converter 68 is controlled by the HV ECU 70 so as to supply the power of the high voltage side power line 61 to the low voltage side power line 66 with the voltage stepped down.

Although not shown, the HV ECU 70 is configured as a microprocessor having a CPU as a main part and includes a ROM that stores processing programs, a RAM that temporarily stores data, input and output ports, and a communication port, in addition to the CPU. Signals from various sensors are input to the HV ECU 70 via the input port. The signals input to the HV ECU 70 include, for example, a rotational position φm of a rotor of the motor 30 output from a rotational position sensor 30a (for example, a resolver) that detects the rotational position of the rotor of the motor 30, and a rotation speed NLin of the input shaft 41 output from a rotation speed sensor 41a attached to the input shaft 41, a rotation speed NLout of the intermediate rotary shaft 44 output from a rotation speed sensor 44a attached to the intermediate rotary shaft 44, and a rotation speed Np of the drive shaft 46 output from a rotation speed sensor 46a attached to the drive shaft 46. Further, the signals input to the HV ECU 70 also include a voltage Vb of the high voltage battery 60 output from a voltage sensor attached between terminals of the high voltage battery 60 and a current Ib of the high voltage battery 60 output from a current sensor attached to an output terminal of the high voltage battery 60. Further, the signals input to the HV ECU 70 also include an ignition signal output from an ignition switch 80, a shift position SP output from a shift position sensor 82 that detects an operating position of the shift lever 81, and an accelerator operation amount Acc output from an accelerator pedal position sensor 84 that detects an amount of depression of an accelerator pedal 83, a brake pedal position BP output from a brake pedal position sensor 86 that detects a depression amount of a brake pedal 85, and a vehicle speed V output from a vehicle speed sensor 88.

Various control signals are output from the HV ECU 70 via the output port. The signals output from the HV ECU 70 include, for example, a control signal output to the starter motor 25 and a control signal output to the alternator 26. Further, the signals output from the HV ECU 70 also include a control signal to the inverter 32, a control signal to the clutch 36, a control signal to the automatic transmission device 40 (the lock-up clutch 43a and the automatic transmission 45), and a control signal to the DC/DC converter 68. The HV ECU 70 is connected to the engine ECU 24 via the communication port. The HV ECU 70 also calculates the motor speed Nm of the motor 30 (rotation speed of the input shaft 41 of the automatic transmission device 40) based on the rotational position φm of the rotor of the motor 30 output from the rotational position sensor 30a. Further, the HV ECU 70 also calculates a rotation speed difference ΔNL of the lock-up clutch 43a as a difference between the rotation speed NLin of the input shaft 41 output from the rotation speed sensor 41a and the rotation speed NLout of the intermediate rotary shaft 44 output from the rotation speed sensor 44a.

The hybrid vehicle 20 of the embodiment that is configured as described above travels in an electric driving (EV driving) mode in which the hybrid vehicle 20 travels using the power from the motor 30 with the clutch 36 being disengaged, and travels in a hybrid driving (HV driving) mode in which the hybrid vehicle 20 travels using the power from the engine 22 and the power from the motor 30 with the clutch 36 being engaged.

In the EV driving mode, the HV ECU 70 basically executes an EV driving control described below. First, the HV ECU 70 sets a target shift speed M* of the automatic transmission 45 based on a shift line with respect to the accelerator operation amount Acc and the vehicle speed V, and controls the automatic transmission 45 such that a shift speed M of the automatic transmission 45 becomes the target shift speed M*. Further, the HV ECU 70 sets required torque Tp* of the drive shaft 46 (the output shaft 42 of the automatic transmission device 40) based on the accelerator operation amount Acc and the vehicle speed V, and calculates required torque Tin* of the input shaft 41 of the automatic transmission device 40 based on the required torque Tp* of the drive shaft 46 and a gear ratio corresponding to the shift speed M of the automatic transmission 45. The HV ECU 70 then sets a torque command Tm* of the motor 30 (a direction in which the motor speed of the motor 30 is increased is set as a positive value) such that the required torque Tin* is output to the input shaft 41, and controls switching of the switching elements of the inverter 32 such that the motor 30 is driven in accordance with the torque command Tm*.

Even in the EV driving mode, when a heating request is issued from an air conditioner (not shown), for example, the HV ECU 70 may execute the EV driving control as described above while independently driving the engine 22 with the clutch 36 being disengaged.

In the HV driving mode, the HV ECU 70 basically executes an HV driving control described below. The control of the automatic transmission 45 is executed in the same manner as in the EV driving mode. In the control of the engine 22 and the motor 30, the HV ECU 70 first calculates the required torque Tin* of the input shaft 41 as in the EV driving mode. Next, the HV ECU 70 sets a target torque Te* of the engine 22 (a direction in which the engine speed Ne of the engine 22 is increased is set as a positive value) and the torque command Tm* of the motor 30 such that the required torque Tin* is output to the input shaft 41. Then, the HV ECU 70 controls the engine 22 such that the engine 22 is driven in accordance with the target torque Te*, and controls switching of the switching elements of the inverter 32 such that the motor 30 is driven in accordance with the torque command Tm*.

Figure 3:
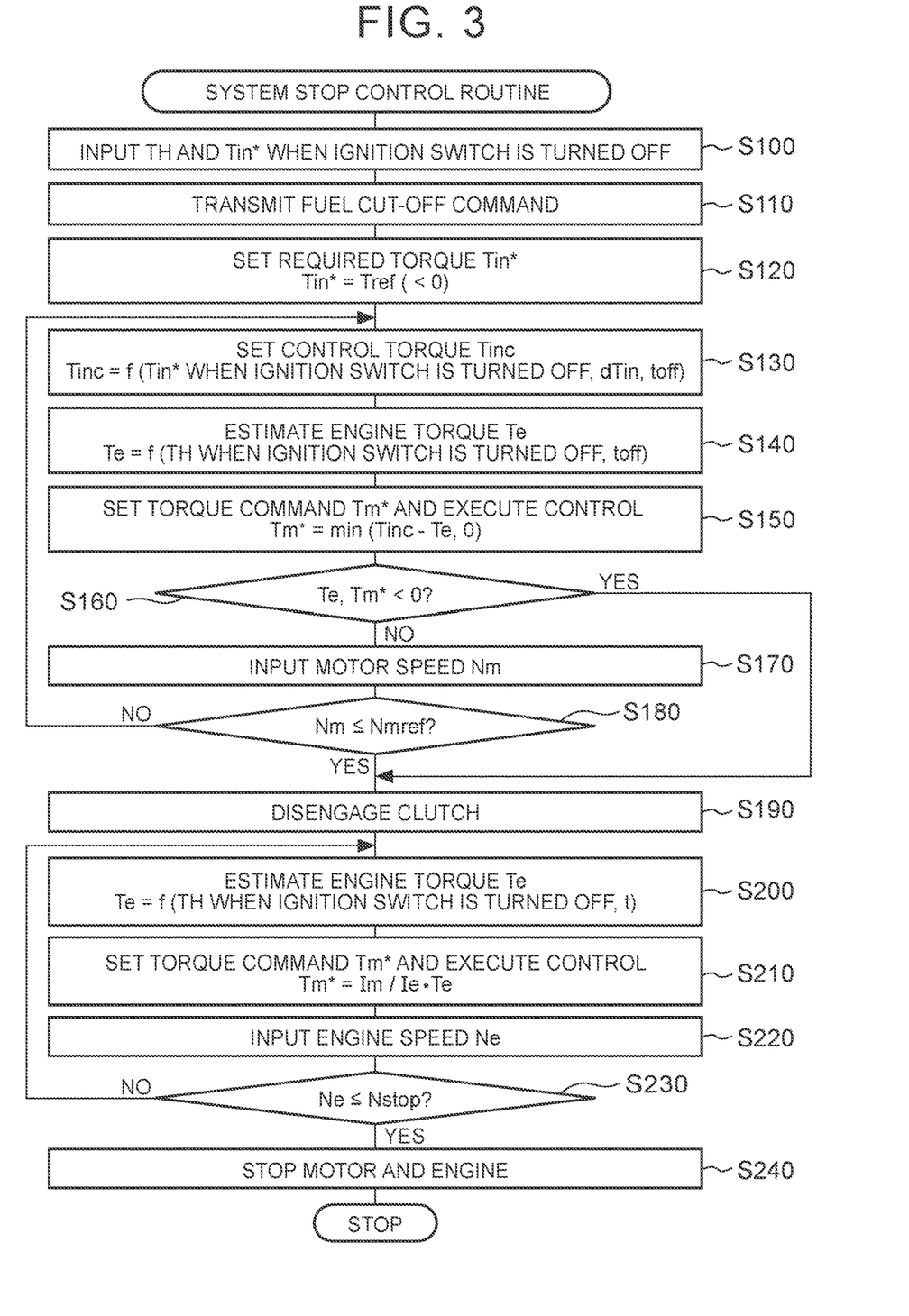
FIG. 3 is a flowchart showing an example of a system stop control routine executed by an HV ECU 70.

Next, the operation of the hybrid vehicle 20 of the embodiment thus configured, particularly the operation when an ignition switch 80 is turned off during traveling in the HV driving mode, will be described. FIG. 3 is a flowchart showing an example of a system stop control routine executed by the HV ECU 70. This routine is executed when the ignition switch 80 is turned off during traveling in the HV driving mode, that is, when the system is stopped from a state where the engine 22 is operating with the clutch 36 engaged. When the ignition switch 80 is turned off, in the automatic transmission 45, the connection between the intermediate rotary shaft 44 and the output shaft 42 is canceled due to engagement and disengagement of the friction engagement elements, and power transmission between the intermediate rotary shaft 44 and the output shaft 42 is cut off.

When this routine is executed, the CPU of the HV ECU 70 executes processing of inputting the throttle opening TH (off time TH) and the required torque Tin* (off time Tin*) when the ignition switch 80 is turned off (step S100). The throttle opening TH that is detected by the throttle position sensor 124a when the ignition switch 80 is turned off is input to the HV ECU 70 via the engine ECU 24 by communication. The required torque Tin* that is set when the ignition switch 80 is turned off is input to the HV ECU 70.

The HV ECU 70 then transmits a fuel cut-off command to the engine ECU 24 (step S110). The engine ECU 24 that has received the fuel cut-off command stops fuel injection from the fuel injection valve 126 and controls a throttle motor 124b such that an opening of the throttle valve 124 is fully closed. In order to suppress the supply of unburnt fuel to the catalyst (three-way catalyst) 134a, the engine 22 ignites the spark plug 130 once for each cylinder and combusts the fuel remaining in each cylinder. Therefore, the engine torque Te output from the engine 22 does not immediately decrease even when the fuel injection from the fuel injection valve 126 is stopped, and decreases after the fuel remaining in each cylinder is combusted.

Subsequently, the HV ECU 70 sets predetermined torque Tref as the required torque Tin* of the input shaft 41 (step S120). The predetermined torque Tref is set as a negative value (a direction in which the rotation of the input shaft 41 is suppressed).

When the required torque Tin* is set in this manner, the HV ECU 70 sets the control torque Tinc using the required torque Tin* (off time Tin*) and a predetermined change rate dTin (an amount of change in the required torque Tin* per unit time) when the ignition switch 80 is turned off and an elapsed time toff after the ignition switch 80 is turned off such that the torque of the input shaft 41 decreases at the predetermined change rate dTin toward the required torque Tin* (step S130). As will be described later, the predetermined change rate dTin takes a value that is determined in advance through experiments or analysis as a change rate such that the engine speed Ne of the engine 22 and the motor speed Nm of the motor 30 do not reach a negative value (that is, reverse rotations of the engine 22 and the motor 30 do not occur) when the clutch 36 is disengaged with the motor speed Nm of the motor 30 being close to a predetermined motor speed Nmref.

Next, the HV ECU 70 estimates current engine torque Te using the throttle opening TH when the ignition switch 80 is turned off (off time TH) and the elapsed time toff (step S140). The HV ECU 70 estimates the corresponding engine torque Te in a manner such that a relationship among the off time TH, the elapsed time toff, and the engine torque is stored in advance in a ROM (not shown) as a map, and when the off time TH and the elapsed time toff are given, the corresponding engine torque is derived and the derived engine torque is estimated as the current engine torque Te.

When the control torque Tinc and the current engine torque Te are set as described above, the HV ECU 70 sets torque obtained by subtracting the current engine torque Te from the control torque Tinc or the value 0, whichever smaller, as a torque command Tm*. The HV ECU 70 then controls the inverter 32 such that the motor 30 is driven in accordance with the torque command Tm* (step S150). By controlling the motor 30 as described above, the control torque Tinc can be output to the input shaft 41 within a range in which the torque output from the motor 30 takes the value of 0 or becomes torque in a direction in which the motor speed of the motor 30 is decreased. Torque in a direction in which the motor speed of the motor 30 is decreased is, for example, torque in a direction opposite to a direction of rotation of the motor 30.

Next, the HV ECU 70 determines whether the engine torque Te and the torque command Tm* are less than 0, that is, whether the engine torque Te and the torque command Tm* are in directions in which respective rotations are suppressed (step S160). When the engine torque Te and the torque command Tm* are less than 0, the HV ECU 70 controls the clutch 36 to be disengaged (step S190). Accordingly, when the engine torque Te and the torque command Tm* are less than 0, that is, when the engine torque Te and the torque command Tm* are in the direction in which respective rotations are suppressed, the clutch 36 is disengaged. Therefore, an increase (racing) of the engine speed Ne of the engine 22 and an increase in the motor speed Nm of the motor 30 can be suppressed.

The HV ECU 70 inputs the motor speed Nm of the motor 30 when at least one of the engine torque Te and the torque command Tm* is equal to or more than 0 (step S170). As the motor speed Nm of the motor 30, a value calculated based on the rotational position ϕm of the rotor of the motor 30 output from the rotational position sensor 30a is input.

When the motor speed Nm of the motor 30 is thus input, the HV ECU 70 determines whether the motor speed Nm is equal to or lower than the predetermined motor speed Nmref (step S180). Here, the predetermined motor speed Nmref is a threshold value for determining whether the engine 22 and the motor 30 rotate in a reverse direction after the clutch 36 is disengaged, and is higher than 0. The predetermined motor speed Nmref is set as, for example, 350 rpm (that is a lower limit value of the motor speed Nm of the motor 30 so as to supply the driving hydraulic pressure to the clutch 36 by a mechanical oil pump). This is because when the motor speed Nm of the motor 30 takes the value 0 or is a very low speed in proximity to the value 0 and the clutch 36 is disengaged, the engine speed Ne of the engine 22 and the motor speed Nm of the motor 30 may take negative values due to inertia, that is, the engine 22 and the motor 30 may rotate in the reverse direction in some cases.

When the motor speed Nm of the motor 30 exceeds the predetermined motor speed Nmref in step S180, the HV ECU 70 returns to step S130, and repeats steps S130 to S180 until the engine torque Te and the torque command Tm* become less than the value 0, or the motor speed Nm of the motor 30 becomes equal to or lower than the predetermined motor speed Nmref. The control torque Tinc in step S130 is set such that the torque of the input shaft 41 decreases toward the required torque Tin* at the predetermined change rate dTin having a negative value. Therefore, by repeating steps S130 to S180, the control torque Tinc takes a negative value, and the rotation speed of the input shaft 41, that is, the engine speed Ne of the engine 22, and the motor speed Nm of the motor 30 decrease.

As described above, when the motor speed Nm of the motor 30 decreases to reach or fall below the predetermined motor speed Nmref in step S180, the HV ECU 70 determines that if the clutch 36 is disengaged in a state where the motor speed Nm of the motor 30 further decreases, the engine 22 and the motor 30 may make reverse rotations after the clutch 36 is disengaged, and based on the determination, the HV ECU 70 causes the clutch 36 to be disengaged (step S190). With this configuration, reverse rotations of the engine 22 and the motor 30 after the clutch 36 is disengaged can be suppressed.

After the clutch 36 is disengaged as described above, the HV ECU 70 then estimates the current engine torque Te (step S200) that is the same processing in step S140 and sets the torque command Tm* of the motor 30 in accordance with Equation (1) below to control the inverter 32 such that the motor 30 is driven in accordance with the torque command Tm* (step S210). In Equation (1), "Ie" is the moment of inertia around the output shaft of the engine 22 when the clutch 36 is in the disengaged state. "Im" is the moment of inertia around the rotary shaft of the motor 30 when the clutch 36 is disengaged. "Te" is the engine torque estimated in step S200. Equation (1) is a relational equation to set a decrease rate dNe/dt of the engine speed Ne of the engine 22 (decrease per unit time of the engine speed Ne of the engine 22) and a decrease rate dNm/dt of the motor speed Nm of the motor 30 (decrease per unit time of the motor speed Nm of the motor 30) when the clutch 36 is disengaged to be the same decrease rate. When the clutch 36 is in the disengaged state, Equations (2) and (3) below are established. Equation (1) can be easily derived by setting the decrease rate dNe/dt and the decrease rate dNm/dt to be the same decrease rate in Equations (2) and (3). Note that, in Equation (3), it is assumed that connection between the intermediate rotary shaft 44 and the output shaft 42 is canceled due to engagement and disengagement of the plurality of friction engagement elements in the automatic transmission 45.

$$Tm* = \frac{Im}{Ie} \cdot Te \quad (1)$$

$$Ie \cdot \frac{dNe}{dt} = Te \quad (2)$$

$$Im \cdot \frac{dNm}{dt} = Tm* \quad (3)$$

As described above, the HV ECU 70 sets the torque command Tm* of the motor 30 using Equation (1) above in step S210 after the clutch 36 is disengaged in step S190, and controls the inverter 32 such that the motor 30 is driven in accordance with the torque command Tm*. Accordingly, the decrease rate dNe/dt of the engine speed Ne of the engine 22 and the decrease rate dNm/dt of the motor speed Nm of the motor 30 can be the same decrease rate after the clutch 36 is disengaged.

Next, the HV ECU 70 inputs the engine speed Ne of the engine 22 (step S220) and determines whether the engine speed Ne of the engine 22 is equal to or lower than a stop engine speed Nstop (step S230). In step S220, the engine speed Ne of the engine 22 that is calculated by the engine ECU 24 based on the crank angle θcr output from the crank position sensor 140 is input by the communication. In step S230, the stop engine speed Nstop is a threshold value for determining whether the rotation of the engine 22 is stopped, and is set to the value 0 or an engine speed close to the value 0 (for example, 3 rpm, 5 rpm, and 7 rpm). The motor speed Nm of the motor 30 becomes the same as the engine speed Ne of the engine 22 when the clutch 36 is in the engaged state. After the clutch 36 is disengaged, the motor speed Nm of the motor 30 decreases at the same decrease rate as that of the engine 22, which makes the motor speed Nm of the motor 30 equal to the engine speed of the engine 22. Therefore, the processing in step S220 is processing to determine whether the rotations of the engine 22 and the motor 30 have been stopped.

When the engine speed Ne of the engine 22 exceeds the stop engine speed Nstop in step S230, the HV ECU 70 determines that the rotations of the engine 22 and the motor 30 are not stopped, and returns to the processing in step S200. The HV ECU 70 then repeats processing in steps S200 to S230 until the engine speed Ne of the engine 22 reaches or falls below the stop engine speed Nstop.

When the engine speed Ne of the engine 22 is equal to or lower than the stop engine speed Nstop in step S230, the HV ECU 70 determines that the rotations of the engine 22 and the motor 30 have been stopped, and stops the operation of the engine 22 and the driving of the motor 30 (Step S240). This routine then ends.

Figure 4:
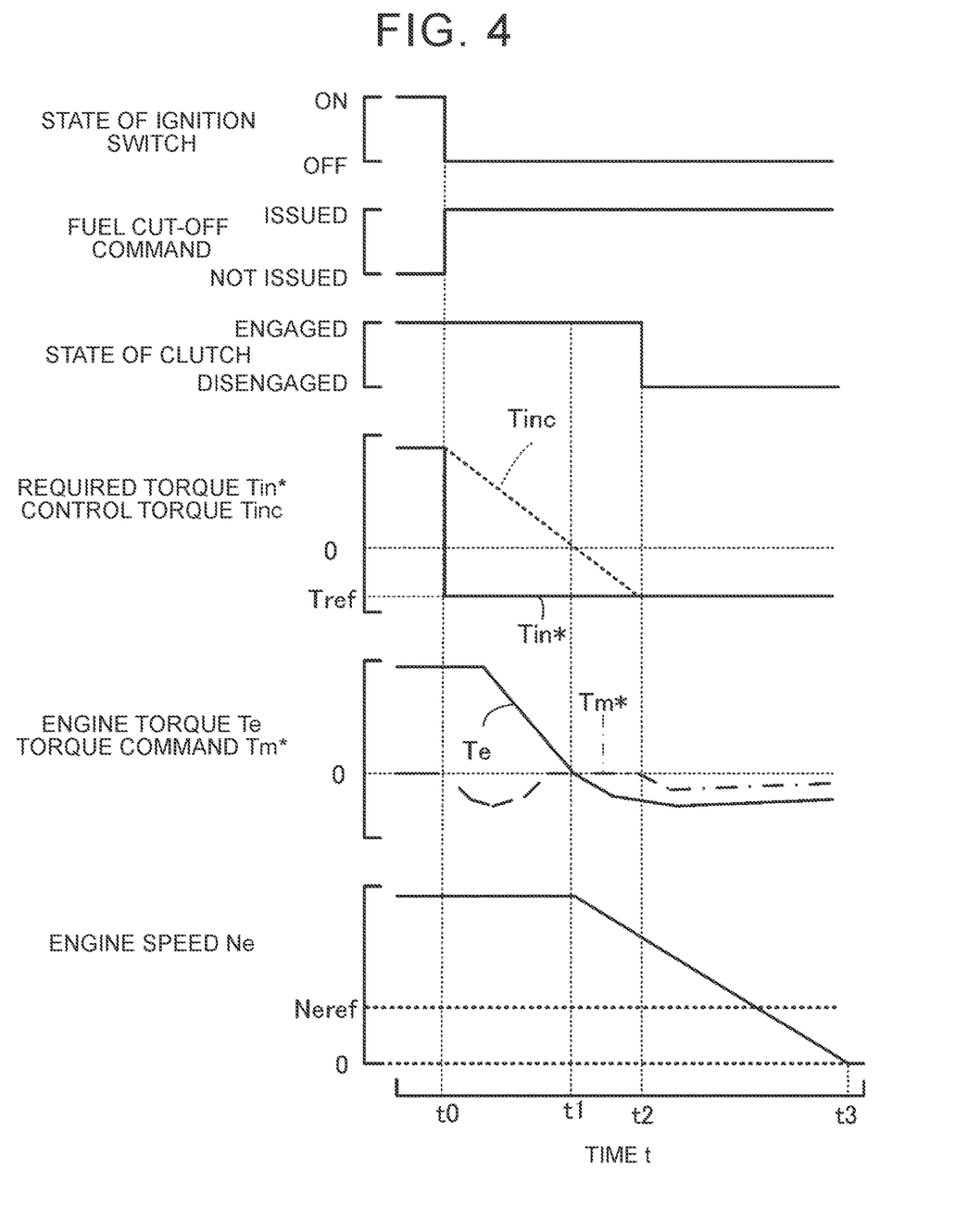
FIG. 4 is an explanatory diagram for describing an example of temporal changes in a state of an ignition switch 80, a state whether a fuel cut-off command is issued, a state of a clutch 36, required torque Tin*, control torque Tinc, engine torque Te, a torque command Tm*, and an engine speed Ne of the engine 22.

FIG. 4 is an explanatory diagram for describing one example of temporal changes in a state of the ignition switch 80, a state whether the fuel cut-off command is issued, a state of the clutch 36, the required torque Tin*, the control torque Tinc, the engine torque Te, the torque command Tm*, and the engine speed Ne of the engine 22. In FIG. 4, the solid lines indicate the state of the ignition switch 80, the state whether the fuel cut-off command is issued, the required torque Tin*, the engine torque Te, and the engine speed Ne of the engine 22. The broken line indicates the control torque Tinc. The long dashed short dashed line indicates the torque command Tm*.

When the ignition switch 80 is turned off, the fuel cut-off command is transmitted to the engine ECU 24 (step S110, at time t0). When the fuel cut-off command is transmitted, the engine 22 stops the fuel injection from the fuel injection valve 126 and then ignites the spark plug 130 to combust the fuel remaining in each cylinder. Therefore, torque is kept to be output from the engine 22 for a while after the fuel injection from the fuel injection valve 126 is stopped. At this time, the HV ECU 70 sets the torque obtained by subtracting the current engine torque Te from the control torque Tinc or the value 0, whichever smaller, as the torque command Tm*, and controls the inverter 32 such that the motor 30 is driven in accordance with the torque command Tm* (steps S140, S150). Therefore, the torque based on the control torque Tinc is output to the input shaft 41, and the torque command Tm* is set as the value of 0 or less.

When the control torque Tinc takes a negative value, the engine torque Te becomes negative, and the engine speed Ne of the engine 22 decreases (at time t1). When the engine torque Te and the torque command Tm* of the motor 30 are less than 0, the clutch 36 is disengaged (step S190, at time t2). At this time, the engine torque Te and the torque command Tm* of the motor 30 are directional torques that reduce the engine speed of the engine 22 and the motor speed of the motor 30. Therefore, an increase of the engine speed Ne of the engine 22 and an increase of the motor speed Nm of the motor 30 when the clutch 36 is disengaged are suppressed. Torque in a direction in which the engine speed of the engine 22 is decreased is, for example, torque in a direction opposite to a direction of rotation of the engine 22.

After the clutch 36 is disengaged, the HV ECU 70 drives the motor 30 in accordance with the torque command Tm* set by Equation (1) above (steps S200 and S210) such that the decrease rate dNe/dt of the engine speed Ne of the engine 22 and the decrease rate dNm/dt of the motor speed Nm of the motor 30 have the same decrease rate. When the engine speed Ne of the engine 22 reaches or falls below the stop engine speed Nstop, the operation of the engine 22 and the driving of the motor 30 are stopped (at time t3). Consequently, the engine 22 and the motor 30 can be stopped more appropriately.

According to the hybrid vehicle 20 of the embodiment described above, when the system is stopped with the fuel supply to the engine 22 stopped from the state where the engine 22 is operating with the clutch 36 in the engaged state, the HV ECU 70 causes the clutch 36 to be disengaged when the engine torque Te and the torque command Tm* to the motor 30 take the value 0 or less. With this configuration, an increase (racing) of the engine speed of the engine 22 and an increase of the motor speed of the motor 30 when the system is stopped can be suppressed.

Further, when the motor speed Nm of the motor 30 reaches or falls below the predetermined motor speed Nmref, the HV ECU 70 causes the clutch 36 to be disengaged regardless of whether the engine torque Te and the torque command Tm* to the motor 30 take the value 0 or less. With this configuration, reverse rotations of the engine 22 and the motor 30 can be suppressed.

Furthermore, after the clutch 36 is disengaged, the HV ECU 70 controls the motor 30 such that the decrease rate dNe/dt of the rotation speed of the engine 22 and the decrease rate dNm/dt of the motor speed Nm of the motor 30 are the same decrease rate. This can suppresses extension of the time from disengagement of the clutch 36 to a stop of the rotation of the motor 30.

Figure 5:
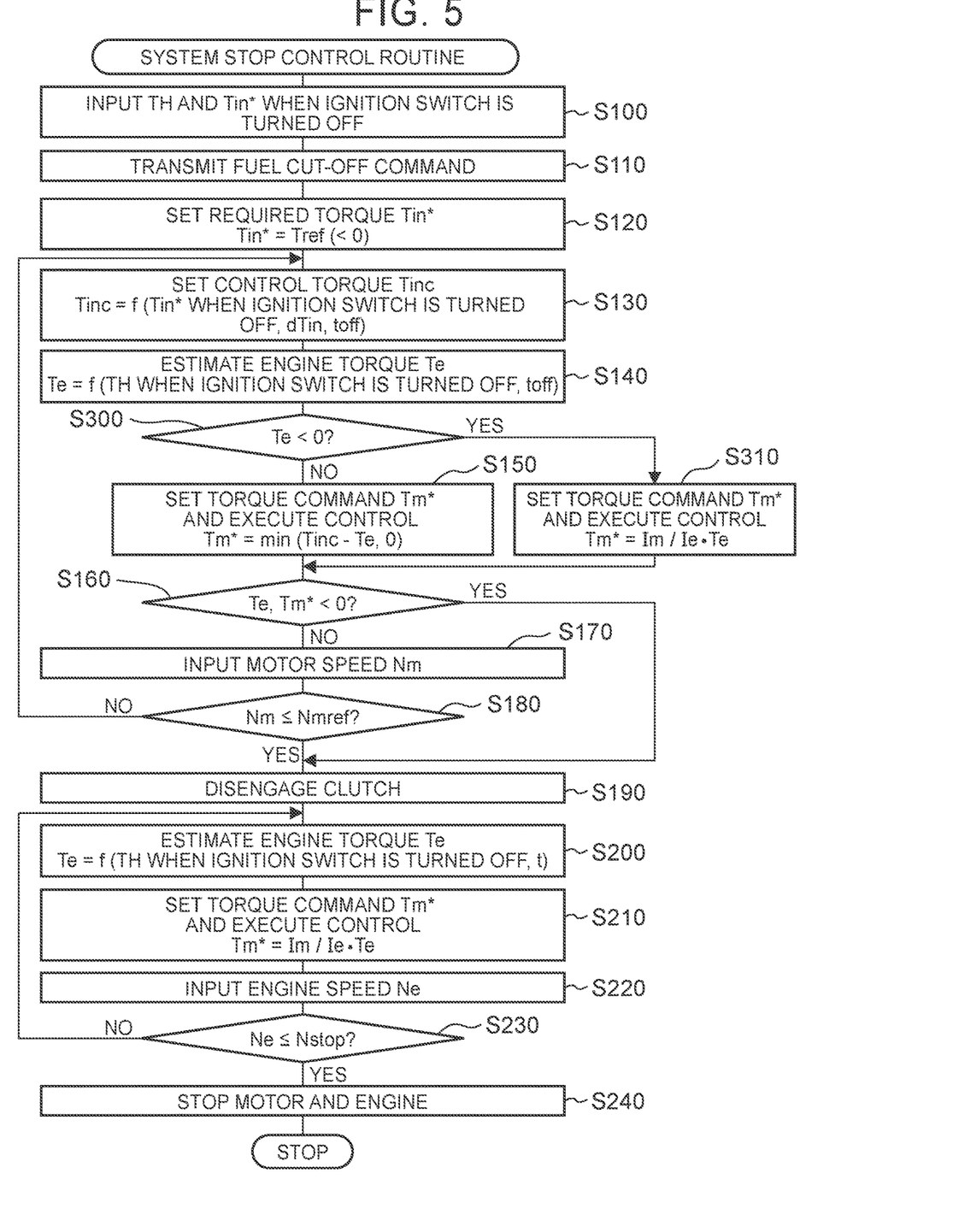
FIG. 5 is a flowchart showing an example of a system stop control routine of a modified example.

In the hybrid vehicle 20 of the embodiment, after the clutch 36 is disengaged, the HV ECU 70 controls the motor 30 such that the decrease rate dNe/dt of the engine speed Ne of the engine 22 and the decrease rate dNm/dt of the motor speed Nm of the motor 30 are the same decrease rate. However, in addition to such control of the motor 30, the HV ECU 70 may control the motor 30 such that the decrease rate dNe/dt of the engine speed of the engine 22 is the same decrease rate before and after the clutch 36 is disengaged. FIG. 5 is a flowchart showing an example of a system stop control routine of a modified example. In this routine, the same processing as that in the system stop control routine exemplified in FIG. 3 is executed except that processing in step S300 is executed between step S140 and step S150 and processing in step S310 is executed when the engine torque Te is less than the value 0 in step S300. Therefore, in the system stop control routine in the modified example, the same processing as that in the system stop control routine exemplified in FIG. 3 is denoted by the same reference sign, and detailed description thereof will be omitted.

The HV ECU 70 estimates the engine torque Te in step S140, and determines whether the engine torque Te is less than the value 0 (step S300). When the engine torque Te is equal to or larger than the value 0, that is, when the engine torque Te is not in the direction in which the rotation of the engine 22 is suppressed, the HV ECU 70 executes the processing in step S150 and subsequent steps. By controlling the motor 30 as described above, the control torque Tinc can be output to the input shaft 41 within a range in which the torque output from the motor 30 takes the value of 0 or becomes torque in a direction in which the motor speed of the motor 30 is decreased.

When the engine torque Te is less than the value 0, that is, when the engine torque Te is in the direction in which the rotation of the engine 22 is suppressed, the HV ECU 70 sets the torque command Tm* of the motor 30 based on Equation (4) below and controls the inverter 32 such that the motor 30 is driven in accordance with the torque command Tm* (step S310). After that, the HV ECU 70 executes step S160 and subsequent steps. In Equation (4), "Te" is the engine torque estimated in step S140. Equation (4) is a relational equation to set the decrease rate dNe/dt of the engine speed Ne of the engine 22 (decrease per unit time of the engine speed Ne of the engine 22) when the clutch 36 is engaged and the decrease rate dNe/dt of the engine speed Ne of the engine 22 when the clutch 36 is disengaged to be the same decrease rate. When the clutch 36 is in the disengaged state, Equation (5) below is established. Equation (4) can be easily derived by setting the decrease rates dNe/dt to be the same decrease rate in Equations (2) and (5). Note that, in Equation (5), it is assumed that connection between the intermediate rotary shaft 44 and the output shaft 42 is canceled due to engagement and disengagement of the plurality of friction engagement elements in the automatic transmission 45. Accordingly, it is possible to suppress a change in the decrease rate dNe/dt of the engine speed Ne of the engine 22 before and after the clutch 36 is disengaged.

$$Tm* = \frac{\text{Im}}{\text{Ie}} \cdot Te \qquad (4)$$

$$(Ie + \text{Im}) \cdot \frac{dNe}{dt} = Te + Tm* \qquad (5)$$

In the hybrid vehicle 20 of the embodiment, the HV ECU 70 determines in steps S170 and S180 whether the motor speed Nm of the motor 30 is equal to or lower than the predetermined motor speed Nmref. However, steps S170 and S180 may not be executed. In this case, when the engine torque Te and the torque command Tm* are less than the value 0 in step S160, the HV ECU 70 controls the clutch 36 to be disengaged. When the engine torque Te and the torque command Tm* are equal to or larger than the value 0 in step S160, the routine may return to step S130, and the HV ECU 70 may repeat steps S130 to S160 until the engine torque Te and the torque command Tm* reaches or falls below the value 0. Further, as another example in which steps S170 and S180 may not be executed, when the engine torque Te and the torque command Tm* do not reach or fall below the value 0, the clutch 36 may be disengaged after a predetermined time has elapsed from turning off of the ignition switch 80.

In the hybrid vehicle 20 of the embodiment, the HV ECU 70 sets the torque command Tm* such that the decrease rate dNe/dt of the engine speed of the engine 22 and the decrease rate dNm/dt of the motor speed Nm of the motor 30 have the same decrease rate in step S210 to drive the motor 30 in accordance with the torque command Tm*. However, the HV ECU 70 may set the torque command Tm* such that a difference between the decrease rate dNe/dt of the engine speed of the engine 22 and the decrease rate dNm/dt of the motor speed Nm of the motor 30 is equal to or less than a predetermined difference and may drive the motor 30 in accordance with the torque command Tm*. The predetermined difference may be determined in advance through experiments or analysis as a value that does not cause the time from the disengagement of the clutch 36 to the stop of the rotation of the motor 30 to be excessively long.

In the hybrid vehicle 20 of the embodiment, the HV ECU 70 sets the torque obtained by subtracting the current engine torque Te from the control torque Tinc or the value 0, whichever smaller, as the torque command Tm* in step S150. However, the HV ECU 70 may set the torque obtained by subtracting the current engine torque Te from the control torque Tinc as the torque command Tm*, or may set a predetermined torque Tmref having a negative value as the torque command Tm*.

In the hybrid vehicle 20 of the embodiment, the HV ECU 70 transmits the fuel cut-off command in step S110, the fuel injection from the fuel injection valve 126 is stopped and the spark plug 130 is ignited to combust the fuel remaining in the each cylinder in the engine 22. However, in the engine 22, the spark plug 130 may not be ignited after the fuel injection from the fuel injection valve 126 is stopped. Even in this case, after the fuel injection from the fuel injection valve 126 is stopped, positive torque may be output from the engine 22 due to a delay in response of the air. However, by applying the disclosure, the clutch 36 is disengaged and therefore an increase (racing) of the engine speed of the engine 22 and an increase of the motor speed of the motor 30 when the system is stopped can be suppressed.

The hybrid vehicle 20 of the embodiment uses the 4-cylinder engine 22. However, a 6-cylinder engine, an 8-cylinder engine, or the like may be used.

The hybrid vehicle 20 of the embodiment includes the engine ECU 24 and the HV ECU 70. However, the engine ECU 24 and the HV ECU 70 may be configured as a single electronic control unit.

The correspondence between the main elements of the embodiment and the main elements of the disclosure will be described. In the embodiment, the engine 22 is an example of an "engine", the motor 30 is an example of a "motor", the clutch 36 is an example of a "clutch", and the engine ECU 24 and the HV ECU 70 are an example of a "electronic control unit".

The embodiment is an example for specifically describing the mode for carrying out the disclosure. Therefore, the correspondence between the main elements of the embodiment and the main elements of the disclosure does not limit the elements of the disclosure. That is, the embodiment is merely a specific example of the disclosure.

Although the mode for carrying out the disclosure has been described above with reference to the embodiment, the disclosure is not limited to the embodiment, and may be embodied in various modes within the scope not departing from the gist of the disclosure.

The disclosure may be used in the manufacturing industry of hybrid vehicles, etc.

What is claimed is:

1. A hybrid vehicle, comprising:
   an engine;
   a motor;
   a clutch configured to connect and disconnect an output shaft of the engine to and from a rotary shaft of the motor; and
   an electronic control unit configured to:
      control the engine, the motor, and the clutch; and
      disengage the clutch when a torque condition is satisfied at a predetermined time when a system is stopped as a fuel supply to the engine is stopped from a state where the engine is operating with the clutch being engaged, the torque condition being a condition under which torque acting on the output shaft of the engine is torque in a direction in which an engine speed of the engine is decreased and torque output to the rotary shaft of the motor is torque in a direction in which a motor speed of the motor is decreased.

2. The hybrid vehicle according to claim 1, wherein the electronic control unit is configured to:
   at the predetermined time, control the motor such that torque having a value of zero or torque in a direction in which a rotation speed of the rotary shaft is decreased acts on the rotary shaft of the motor; and
   disengage the clutch when the torque condition is satisfied.

3. The hybrid vehicle according to claim 1, wherein the electronic control unit is configured to, at the predetermined time, disengage the clutch when the motor speed of the motor reaches or falls below a predetermined motor speed, regardless of whether the torque condition is satisfied.

4. The hybrid vehicle according to claim 1, wherein the electronic control unit is configured to control the motor such that a difference between a first decrease rate and a second decrease rate is equal to or less than a predetermined difference after the clutch is disengaged, the first decrease rate being a decrease amount of the engine speed of the engine per unit time, and the second decrease rate being a decrease amount of the motor speed of the motor per unit time.

5. The hybrid vehicle according to claim 1, wherein the electronic control unit is configured to disengage the clutch after a certain time has elapsed from the predetermined time, regardless of whether the torque condition is satisfied.

6. A method of controlling a hybrid vehicle, comprising:
   stopping a fuel supply to an engine in a state where an output shaft of the engine and a rotary shaft of a motor are connected via a clutch and the engine is operating; and
   disengaging the clutch when a torque condition is satisfied, the torque condition being a condition under which torque acting on the output shaft of the engine is torque in a direction in which an engine speed of the engine is decreased, and torque output to the rotary shaft of the motor is torque in a direction in which a motor speed of the motor is decreased.

* * * * *

UNITED STATES PATENT AND TRADEMARK OFFICE
CERTIFICATE OF CORRECTION

PATENT NO. : 11,458,946 B2
APPLICATION NO. : 17/128969
DATED : October 4, 2022
INVENTOR(S) : Taichi Washio, Masayuki Baba and Nobufusa Kobayashi It is certified that error appears in the above-identified patent and that said Letters Patent is hereby corrected as shown below:

On the Title Page

Item (30), First column; Please insert the following:
-- (30) Foreign Application Priority Data
January 16, 2020 (JP) 2020-005093 --

Signed and Sealed this
Twenty-eighth Day of February, 2023

Katherine Kelly Vidal
*Director of the United States Patent and Trademark Office*